US008388235B1

(12) United States Patent
Volker et al.

(10) Patent No.: US 8,388,235 B1
(45) Date of Patent: Mar. 5, 2013

(54) MODULAR, OPTICAL, WET-MATE CONNECTOR

(75) Inventors: Herbert B. Volker, Arnold, MD (US); Martin S. Moran, Davidsonville, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 121 days.

(21) Appl. No.: 13/189,549

(22) Filed: Jul. 24, 2011

(51) Int. Cl.
G02B 6/36 (2006.01)
(52) U.S. Cl. ............... 385/59; 385/53; 385/52; 385/66; 385/71
(58) Field of Classification Search .......... 385/52, 385/53, 56, 59, 60, 66, 64, 70, 71, 139, 138
See application file for complete search history.

(56) References Cited

U.S. PATENT DOCUMENTS

| 6,736,545 B2 | 5/2004 | Cairns et al. |
| 7,429,136 B2 | 9/2008 | Lewallen et al. |
| 7,596,294 B2* | 9/2009 | Knecht et al. ............. 385/135 |
| 7,628,637 B2 | 12/2009 | Kramer |
| 2002/0076172 A1 | 6/2002 | Meyer et al. |
| 2003/0021555 A1 | 1/2003 | Toth et al. |
| 2004/0033028 A1 | 2/2004 | Cheng |
| 2006/0045428 A1* | 3/2006 | Theuerkorn et al. ............. 385/53 |
| 2007/0025665 A1 | 2/2007 | Dean et al. |
| 2009/0045146 A1 | 2/2009 | Stoesz |
| 2012/0070118 A1* | 3/2012 | Ko ................................. 385/33 |

FOREIGN PATENT DOCUMENTS

WO W08602173 A1 4/1986

OTHER PUBLICATIONS

"Development of HP/HT Fiber-Optic Connectors for Subsea Intelligent Wells", Offshore Completions, p. 48-49, Aug. 2003.

* cited by examiner

*Primary Examiner* — Brian Healy
(74) *Attorney, Agent, or Firm* — Marsteller & Associates, P.C.

(57) ABSTRACT

A modular and scalable high optical fiber count connector assembly (800) is formed by engagement mating of a plug connector (500) to a receptacle connector (700). The plug connector (500) includes a plug shell unit (200) and a pin subassembly unit (400), which includes a plurality of small form factor engagement mate pin connectors (100). The plug connector (500) is formed by inserting the pin subassembly unit (400) into the plug shell unit's (200) hollow body (230). The receptacle connector (700) includes a receptacle shell unit (300) and a socket subassembly unit (600), which includes a plurality of small form factor engagement mate socket connectors (150). The receptacle connector (700) is formed by inserting the socket subassembly unit (600) into the receptacle shell unit (300) hollow body (330).

20 Claims, 7 Drawing Sheets

MODULAR, OPTICAL, WET-MATE CONNECTOR

BACKGROUND OF THE INVENTION

1. Technical Field

This invention relates to a modular and scalable high optical-fiber count wet engagement mate connector assembly.

2. Background Art

There are many types of connectors for making connections of optical-fiber cables in underwater, high-pressure, and other harsh environments. Such connectors typically comprise a plug unit containing pin connectors with cable rear ends and pin contact forward ends, and a receptacle unit containing complementary (equivalent) socket connectors with cable rear ends and socket contact forward ends for mate engagement with the pin contacts. Typically, the plug unit pin contacts extend into the receptacle unit when the plug and receptacle units are connected. The wet (underwater) connectors are designed for a limited number of mate/demate cycles, which are performed by a diver or a remotely operated underwater vehicle, as compared to non-underwater connectors. This limitation is due to small amounts of water and contaminates getting into the connector each time it is mated.

A known wet-mate connector is disclosed in US Patent Application Publication No. 2009/0045146 to Carl Stoesz. A further known wet-mate connector assembly for fiber optics (model G3) is available from Sea Con of Bellville, Tex.

A variety of sealing mechanisms are being used for achieving wet engagement mate of the pin and socket connectors. Typically, for wet engagement mate connections, both the socket and pin connector contacts reside in a pressure-balanced sealed fluid-filled chamber. These designs are inherently compatible with any ocean depth since the operating surfaces see essentially no differential in pressure. During engagement mating, as the plug and receptacle units come together, the seals exclude any external fluid and particulate debris. As the mating occurs, both fluid chamber and seals simultaneously move or change shape opening a clean, compensation fluid filled path between the plug and receptacle internal volumes. The final mating step passes the plug unit contact pins through opening seals and aligns them to the receptacle socket contacts creating a clean physical connection. In this operational sequence, the pin and socket connector contacts are never exposed to the external environment before, during, or after mating, ensuring a long-term, reliable optical connection. To demonstrate survivability in harsh underwater environments, the wet-mate connectors are subjected to mechanical shock, vibration, and extensive thermal and pressure qualification testing. In addition, qualification testing can include turbid tank mate/demate testing to ensure survivability in harsh near bottom water conditions. In these tests, the connector is placed in a tank filled with a fully agitated sand/silt mixture. The connector is then repeatedly mated and demated to ensure successful and reliable operation.

The individual pin and socket wet-mate connectors that are contained in the plug and receptacle connector units, respectively, are typically enclosed in protective housing and have alignment and latching features for pin to socket mate engagement. Each individual pin and socket connector can accommodate multiple optical fibers with a range of four to eight fibers being a typical number. With optical fibers being used in various types of sensor arrays, and in broadband telecommunication applications including voice, video, and data transmission, connectors that can simultaneously connect a large number of optical fibers at a single connection point are highly desirable.

It is therefore desirable to provide a wet-mate connector capable of accommodating high optical-fiber counts in a modular scalable package with relatively low physical size and weight. It should be noted that while a number of noteworthy advances and technological improvements have been achieved within the art of pin and socket wet-mate connectors, none completely fulfill the specific objectives achieved by this invention.

DISCLOSURE OF INVENTION

In accordance with the present invention, a modular and scalable high optical-fiber count wet-mate connector assembly comprises a plug connector and a receptacle connector adapted for mating engagement with the plug connector. The plug connector includes a plug shell unit having a forward end, a rear end, and a hollow body. An alignment pin is situated on a top surface of the plug shell unit. The plug connector also includes a pin subassembly unit having a plurality of small form factor engagement mate pin connectors. The pin connectors have pin contact forward ends and cable rear ends. The forward end of the pin subassembly unit includes a plurality of pin connector pin contacts, and the rear end of the pin subassembly includes a plurality of complementary pin connector cables. The plug connector is formed by inserting the pin subassembly unit into the plug shell unit hollow body. The forward end of the plug connector includes the plurality of pin connector pin contacts, and the rear end of the plug connector includes the plurality of complementary pin connector cables.

The receptacle connector includes a receptacle shell unit having a forward end, a rear end, and a hollow body. An alignment slot is situated on a top surface of the receptacle shell unit. The receptacle connector also includes a socket subassembly unit having a plurality of small form factor engagement mate socket connectors. The socket connectors have socket contact forward ends and cable rear ends. The forward end of the socket subassembly unit includes a plurality of socket connector socket contacts, and the rear end of the socket subassembly includes a plurality of complementary socket connector cables. The receptacle connector is formed by inserting the socket subassembly unit into the receptacle shell unit hollow body. The forward end of the receptacle connector includes the plurality of socket connector socket contacts, and the rear end of the receptacle connector includes the plurality of complementary socket connector cables. The forward end of the receptacle connector wet engagement mates to the forward end of the plug connector, which includes alignment of the plug shell unit alignment pin to the receptacle shell unit alignment slot, and latching of the plug shell unit to the receptacle shell unit. The connector's receptacle shell unit and plug shell unit can be circular or rectangular. A splice chamber can be situated in contact with the rear end of the plug connector to combine the plurality of complementary pin connector cables into a single cable. A splice chamber can also be situated in contact with the rear end of the receptacle connector to combine the plurality of complementary socket connector cables into a single cable. The plug connector plurality of pin contacts can be spatially fixed, while the receptacle connector plurality of socket contacts can be floating to accommodate alignment. The plurality of floating socket connector socket contacts can optionally include a complementary plurality of plungers preloaded with plunger springs; however, it is to be understood that either the pins or sockets can be floating, and that the floating half are backed by springs to ensure complete mating of each pin and socket.

A method for assembling a modular and scalable high optical-fiber count connector, comprising a plug connector and a receptacle connector adapted for wet mating engagement with the plug connector is also provided. The plug connector includes a plug shell unit having a forward end, a rear end, and a hollow body. An alignment pin is situated on a top surface of the plug shell unit. The plug connector also includes a pin subassembly unit formed by ganging together a plurality of small form factor engagement mate pin connectors having a pin contact forward end and a cable rear end. The pin subassembly unit is formed having a forward end including a plurality of pin contacts, and a rear end including a plurality of complementary pin connector cables. Inserting the pin subassembly unit into the plug shell unit hollow body forms the plug connector with a forward end including a plurality of pin connector pin contacts, and a rear end including a plurality of complementary pin connector cables. The receptacle connector includes a receptacle shell unit having a forward end, a rear end, and a hollow body. The receptacle connector also includes a socket subassembly unit formed by ganging together a plurality of small form factor engagement mate socket connectors having a socket contact forward end and a cable rear end. The socket subassembly unit is formed having a forward end including a plurality of socket connector socket contacts, and a rear end including a plurality of complementary socket connector cables. Inserting the socket subassembly unit into the receptacle shell unit hollow body forms the receptacle connector with a forward end including a plurality of socket contacts, and a rear end including a plurality of complementary socket connector cables. The modular and scalable high optical-fiber count connector is assembled by engagement mating the forward end of the receptacle connector to the forward end of the plug connector, which includes alignment of the plug shell unit alignment pin to the receptacle shell unit alignment slot, and latching of the plug shell unit to the receptacle shell unit.

These and other objects, advantages and preferred features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

MODE(S) FOR CARRYING OUT THE INVENTION

Figure 1:
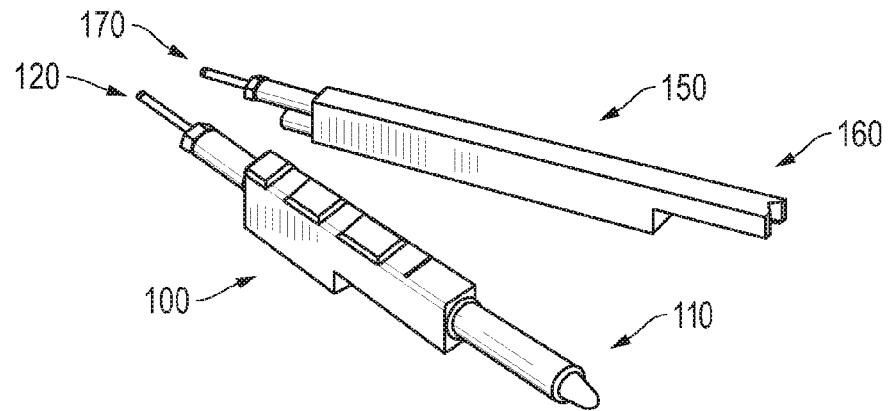
FIG. 1 is a schematic of an exemplary known small form factor wet engagement mate pin and socket connectors.

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

The description below is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "forward," "rear," "front," "back," "up," "down," "top" and "bottom," as well as derivatives thereof, should be construed to refer to the orientation as then described or as shown in the drawing figure under discussion. These relative terms are for convenience of description and normally are not intended to require a particular orientation. Terms concerning attachments, coupling and the like, such as "connected" and "attached," refer to a relationship wherein structures are secured or attached to one another either directly or indirectly through intervening structures, as well as both movable or rigid attachments or relationships, unless expressly described otherwise.

In describing various embodiments, specific terminology is employed for the sake of clarity. However, the invention is not intended to be limited to the specific terminology so selected. It is to be understood that each specific element includes all technical equivalents which operate in a similar manner to accomplish a similar purpose.

Although certain embodiments of the modular and scalable high optical-fiber count wet engagement mate connector assembly discussed below utilize circular receptacle and plug geometries for illustration purposes, a person of ordinary skill in the art will readily recognize that the modular and scalable high optical-fiber count wet engagement mate connector assembly is not limited to this particular geometry, and may, in fact, be of rectangular or other geometric configuration. In addition, although particular small form factor pin and sockets connectors are utilized for illustration purposes, a person of ordinary skill in the art will readily recognize that the scalable high optical-fiber count wet engagement mate connector assembly is not limited to these particular connectors.

With reference now to FIG. 1, shown are an exemplary known small form factor (SFF) wet engagement mate pin connector 100, and an exemplary SFF wet engagement mate socket connector 150. The invention gangs together multiple SFF wet-mate connectors 100 and 150 into a modular package to produce a high optical-fiber count wet-mate connector. The individual SFF connectors 100 and 150 are stripped-down versions of a complete connector in that they have no housing to protect them, no latching feature to hold them together after mating, and limited alignment features. Thus, SFF connectors 100 and 150 in and of themselves are not suitable for mating subsea by a diver or remotely operated underwater vehicle due to their lack of housing and latching mechanism, and their minimal alignment features. The stripped-down design minimizes the size of the individually ganged SFF connectors 100 and 150, minimizing the size of the modular connector of this invention. The wet engagement mate pin connector 100 has a pin contact forward end 110 and a cable rear end 120. The wet engagement mate socket connector 150 has a socket contact forward end 160, adapted for mating engagement with the pin contact forward end 110, and a cable rear end 170. The individual SFF connectors 100 and 150 can accommodate more than one optical fiber with a range of four to eight fibers being a typical number.

Figure 2:
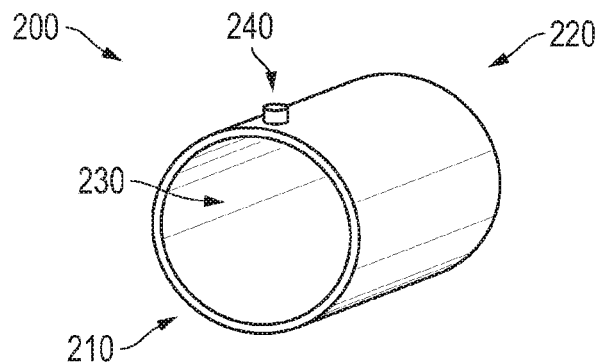
FIG. 2 is a schematic of a plug shell unit.

With reference now to FIG. 2, shown is a plug shell unit 200 having a forward end 210, a rear end 220, and a hollow body 230. The plug shell unit 200 has an alignment pin 240 situated on its top outer surface. The plug shell unit 200 provides protective housing for the SFF wet engagement mate pin connectors 100 as well as latching and alignment capabilities through its plug shell 200 and alignment pin 240.

Figure 3:
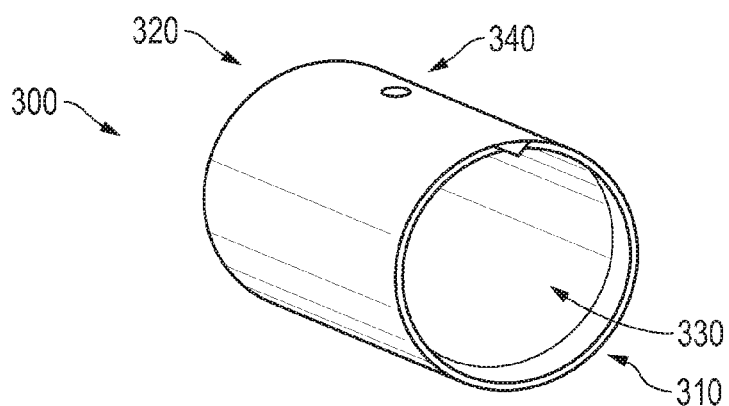
FIG. 3 is a schematic of a receptacle shell unit.

FIG. 3 is a schematic of a receptacle shell unit 300 having a forward end 310, a rear end 320, and a hollow body 330. The receptacle shell unit 300 has an alignment slot 340 situated on its top outer surface. The receptacle shell unit 300 provides protective housing for the SFF wet engagement mate socket connectors 150 as well as latching and alignment capabilities through its receptacle shell 300 and alignment slot 340.

Figure 4:
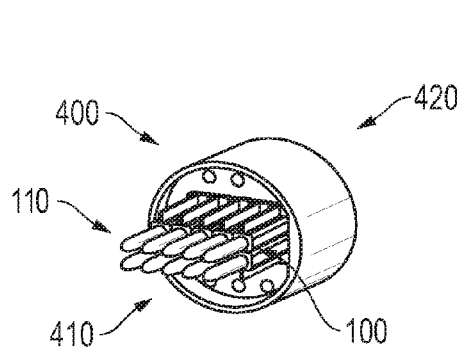
FIG. 4 is a schematic of a pin subassembly unit.
Figure 5:
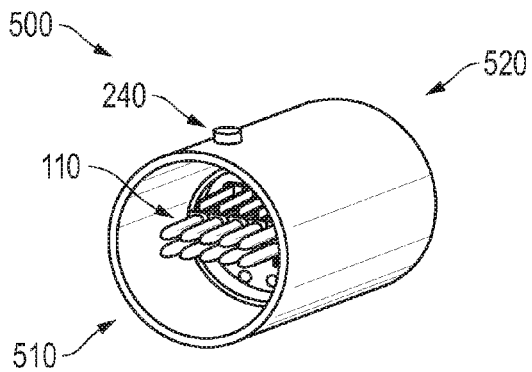
FIG. 5 is a schematic of a plug connector unit.

With reference now to FIG. 4, shown is an exemplary pin subassembly unit, which gangs together a plurality of SFF wet engagement mate pin connectors 100. The forward end 410 of the pin subassembly unit 400 includes a plurality of pin connector 100 pin contacts 110, and the rear end 420 of the pin subassembly unit 400 includes a plurality of complementary pin connector cables 120. Although the pin subassembly unit 400 is shown to accommodate ten SFF wet engagement mate pin connectors 100 in a rectangular configuration for illustrative purposes, a person of ordinary skill in the art will readily recognize that other configurations and pin connector numbers can readily be accommodated. Inserting the pin subassembly unit 400 into the plug shell unit 200 hollow body 230 forms the plug connector 500 shown in the schematic of FIG. 5. The forward end 510 of the plug connector 500 includes the plurality of pin connector 100 pin contacts 110, and the rear end 520 of the plug connector 500 includes the plurality of complementary pin connector cables 120.

Figure 6:
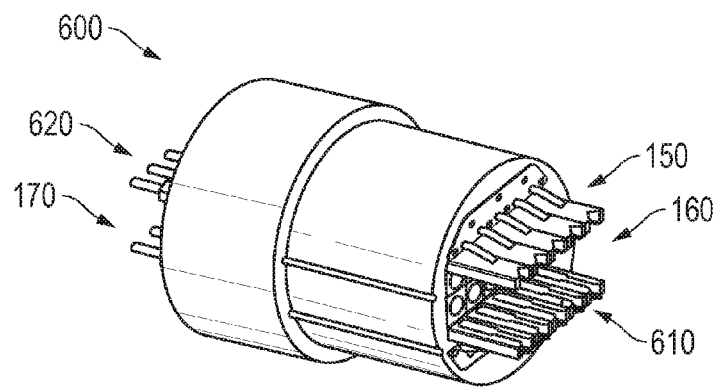
FIG. 6 is a schematic of a socket subassembly unit.
Figure 7:
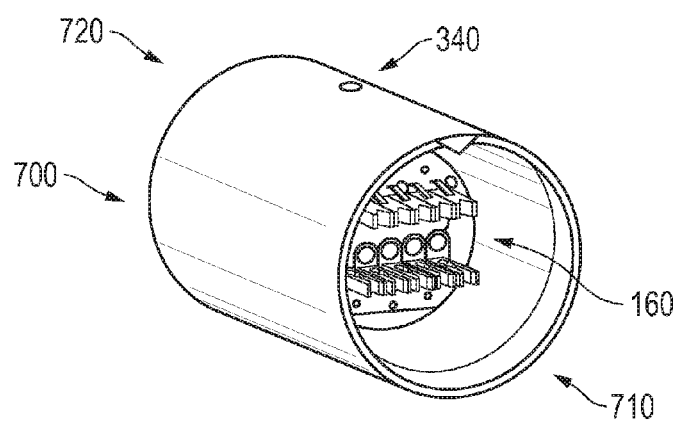
FIG. 7 is a schematic of a receptacle connector.
Figure 8:
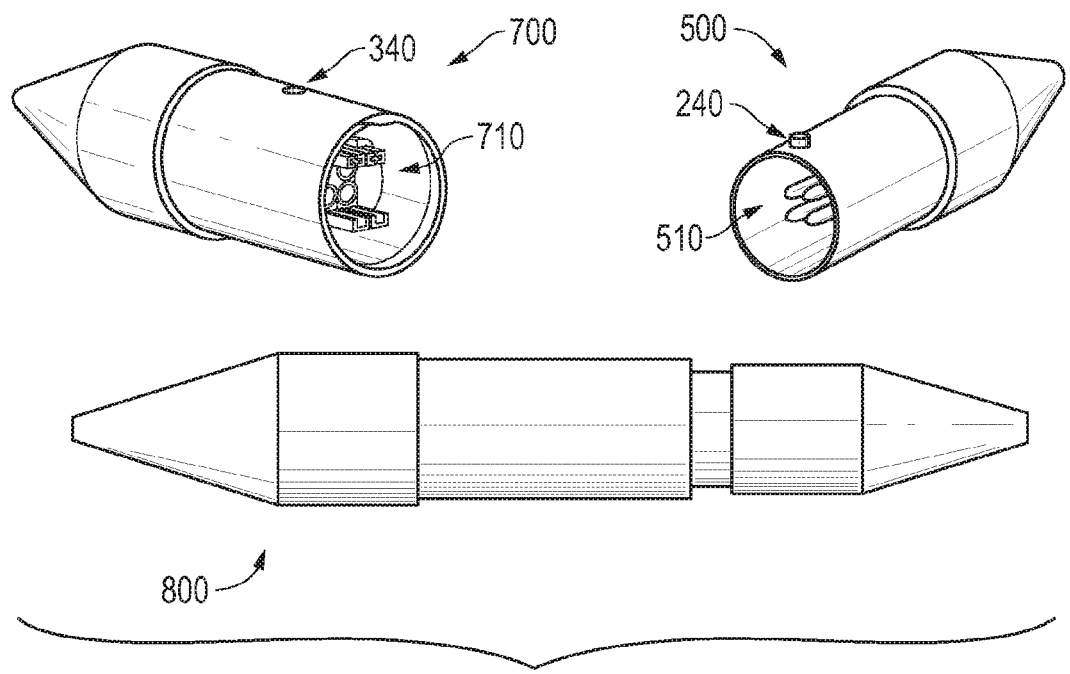
FIG. 8 is a schematic of a modular and scalable high optical-fiber count connector assembly.
Figure 9:
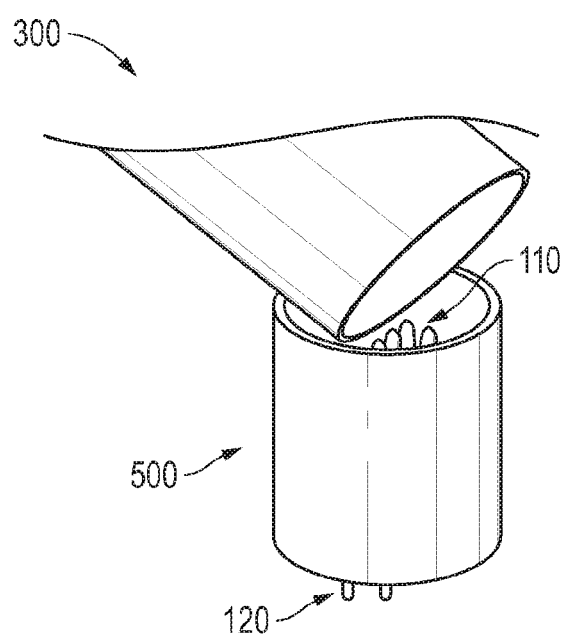
FIG. 9 is a schematic of a scoop-proof circular connector design wherein the receptacle shell unit's improper mating with the plug connector does not damage the plug connector's pin contacts.

With reference now to FIG. 6, shown is an exemplary socket subassembly unit 600, which gangs together a plurality of SFF wet engagement mate socket connectors 150. The forward end 610 of the socket subassembly unit 600 includes a plurality of socket connector 150 socket contacts 160, and the rear end 620 of the socket subassembly unit 600 includes a plurality of complementary socket connector cables 170. Although the socket subassembly unit 600 is shown to accommodate ten SFF wet engagement mate socket connectors 150 in a rectangular geometry for illustrative purposes, a person of ordinary skill in the art will readily recognize that other geometries and socket connector numbers can readily be accommodated. Inserting the socket subassembly unit 600 into the receptacle shell unit 300 hollow body 330 forms the receptacle connector 700 shown in the schematic of FIG. 7. The forward end 710 of the receptacle connector 700 includes the plurality of socket connector 150 socket contacts 160, and the rear end 720 of the receptacle connector 700 includes the plurality of complementary socket connector cables 170. The receptacle connector 700 is adapted for mating engagement with the plug connector 500. The exemplary modular and scalable high optical-fiber count connector assembly 800 shown in FIG. 8 is formed by engagement mating the forward end 710 of the receptacle connector 700 to the forward end 510 of the plug connector 500. In FIG. 8 and for illustrative purposes, the receptacle connector 700 includes four socket connector 150 socket contacts 160, while the plug connector 500 includes four pin connector 100 pin contacts 110. Alignment is provided by the plug shell unit 200 and the receptacle shell unit 300 circular configurations as well as by the latching of plug shell unit to the receptacle shell unit and particularly of the plug shell unit alignment pin 240 to the receptacle shell unit alignment slot 340. The plug shell unit's 200 and the receptacle shell unit's 300 circular designs are scoop-proof, i.e., they prevent the receptacle shell unit 300 from damaging the plug connector 500 SFF wet engagement mate pin connector 100 pin contacts 110, in the event of improper wet engagement mating. This is schematically illustrated in FIG. 9, where the receptacle shell unit's 300 improper mating with the plug connector 500 does not damage the wet engagement mate pin connector 100 pin contacts 110.

The modular and scalable high optical-fiber count connector assembly 800 possesses wet engagement mating capability that includes wet engagement mating by its constituent SFF wet engagement mate pin connectors 100 and complementary SFF wet engagement mate socket connectors 150. Undersea wet engagement mating of the forward end 710 of the receptacle connector 700 to the forward end 510 of the plug connector 500 can be accomplished among other means by divers and remotely operated underwater vehicles. Exemplary dimensions for the modular and scalable high optical-fiber count connector assembly 800, in the circular plug connector 500 and circular socket connector 700 geometries, are a diameter of 6.5 inches and a length of 48 inches and a diameter of 9.5 inches and a length of 56 inches for the four pin/socket connector and ten pin/socket connector counts, respectively. The four connector receptacle and plug have estimated weights of 60 pounds and 30 pounds, respectively, in a dry engagement mate configuration, and 50 pounds and 25 pounds, respectively, in a wet engagement mate configuration. The ten connector receptacle and plug have estimated weights of 120 pounds and 60 pounds, respectively, in a dry engagement mate configuration, and 100 pounds and 50 pounds, respectively, in a dry engagement mate configuration.

Because the design of the modular and scalable high optical-fiber count connector assembly 800 is modular, various optical-fiber count connectors can be produced with minimal further development effort. As an example, optical fiber counts of 12 to over 48 are feasible with this invention. In addition, since each SFF wet engagement mate pin connector 100 and each complementary SFF wet engagement mate socket connector 150 is an independent wet mate connector, if one were to fail, only a limited number of optical fiber connections would be lost; only the number of optical fibers in the individual wet mate connector that failed. This failure mode greatly improves reliability and is in contrast to prior art concepts for high optical fiber count connectors where all the optical fibers are connected in a single wet mate connector chamber, where if that connector chamber fails, all optical fiber connections are lost.

Figure 10:
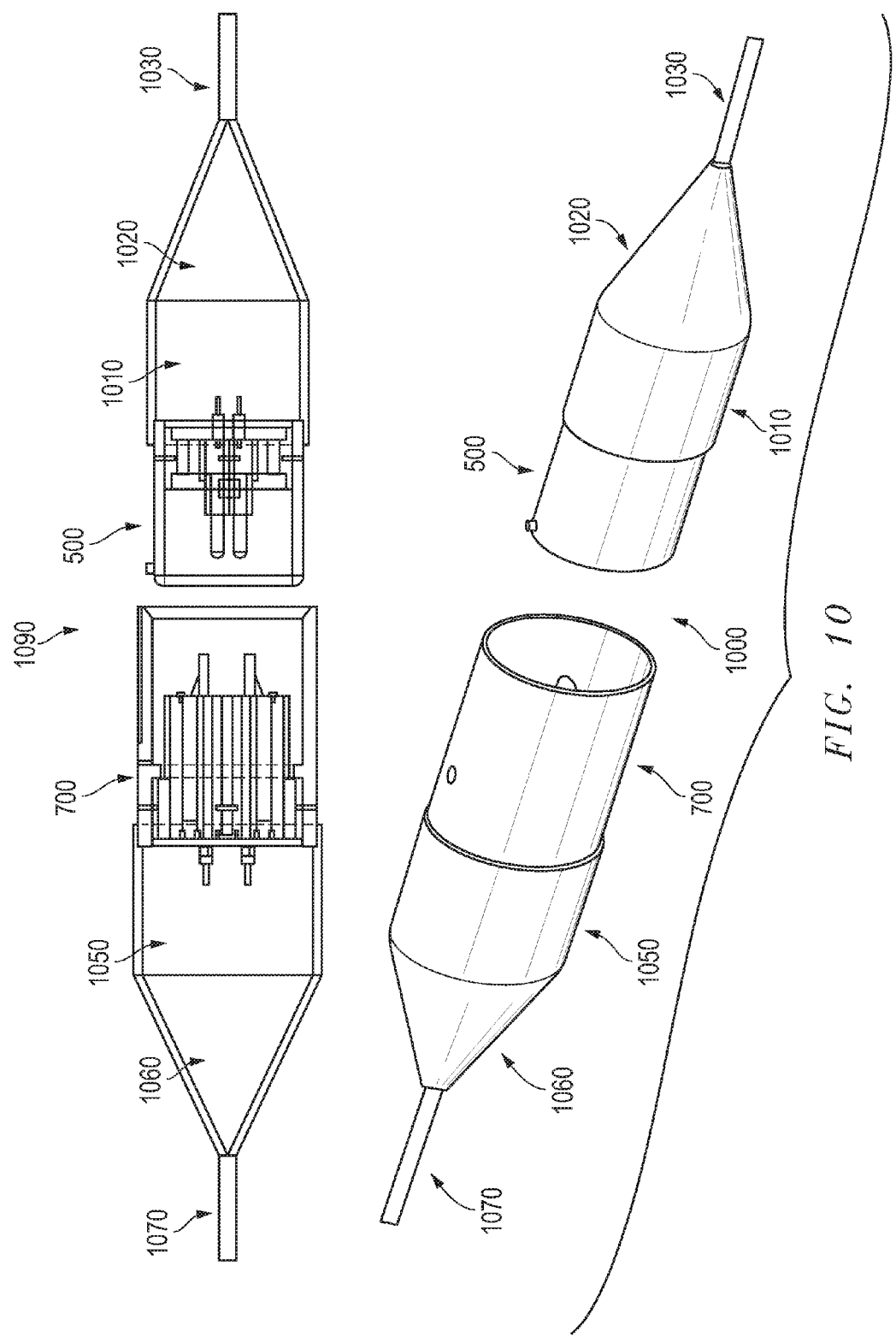
FIG. 10 is a mechanical drawing and a schematic of a modular and scalable connector assembly including splice chambers and strain relief volumes.

With reference now to FIG. 10, shown are an exemplary mechanical drawing 1090 and an exemplary schematic 1000 of a modular and scalable high optical-fiber count connector assembly 800 including splice chambers 1010 and 1050 and strain relief volumes 1020 and 1060. The splice chamber 1010 is in contact with the rear end 520 of the plug connector 500 and combines the plurality of complementary pin connector cables 120, situated at the rear end 520 of the plug connector 500, into one cable 1030 leaving the rear end of the splice chamber 1010. A strain relief volume 1020 is connected to the rear end of the splice chamber 1010 to prevent damage of the cable 1030 as it leaves the splice chamber 1010. The splice chamber 1050 is in contact with the rear end 720 of the receptacle connector 700. The splice chamber 1050 combines the plurality of complementary socket connector cables 170, situated at the rear end 720 of the receptacle connector 700, into one cable 1070 leaving the rear end of the splice chamber 1050. A strain relief volume 1060 is connected to the rear end of the splice chamber 1050 to prevent damage of the cable 1070 as it leaves the splice chamber 1050. For relatively short cable assemblies, the plurality of complementary pin connector cables 120 need not be combined into a single cable 1030 and splice chamber 1010 may be eliminated. Similarly, for relatively short cable assemblies, the plurality of complementary socket connector cables 170 need not be combined into a single cable 1070 and splice chamber 1050 may be eliminated.

As illustrated in FIG. 8, alignment of the modular and scalable high optical-fiber count connector assembly 800 includes the plug shell unit's 200 and the receptacle shell unit's 300 circular configurations as well as the latching of the plug shell unit 200 to the receptacle shell unit 300 and alignment of the plug shell unit alignment pin 240 to the receptacle shell unit alignment slot 340. In addition, the pin subassembly unit 400, which gangs together a plurality of SFF wet engagement mate pin connectors 100, and the socket subassembly unit 600, which gangs together a plurality of SFF wet engagement mate socket connectors 150, have their own alignment features for final alignment of the plug connector 500 to the receptacle connector 700.

Figure 11:
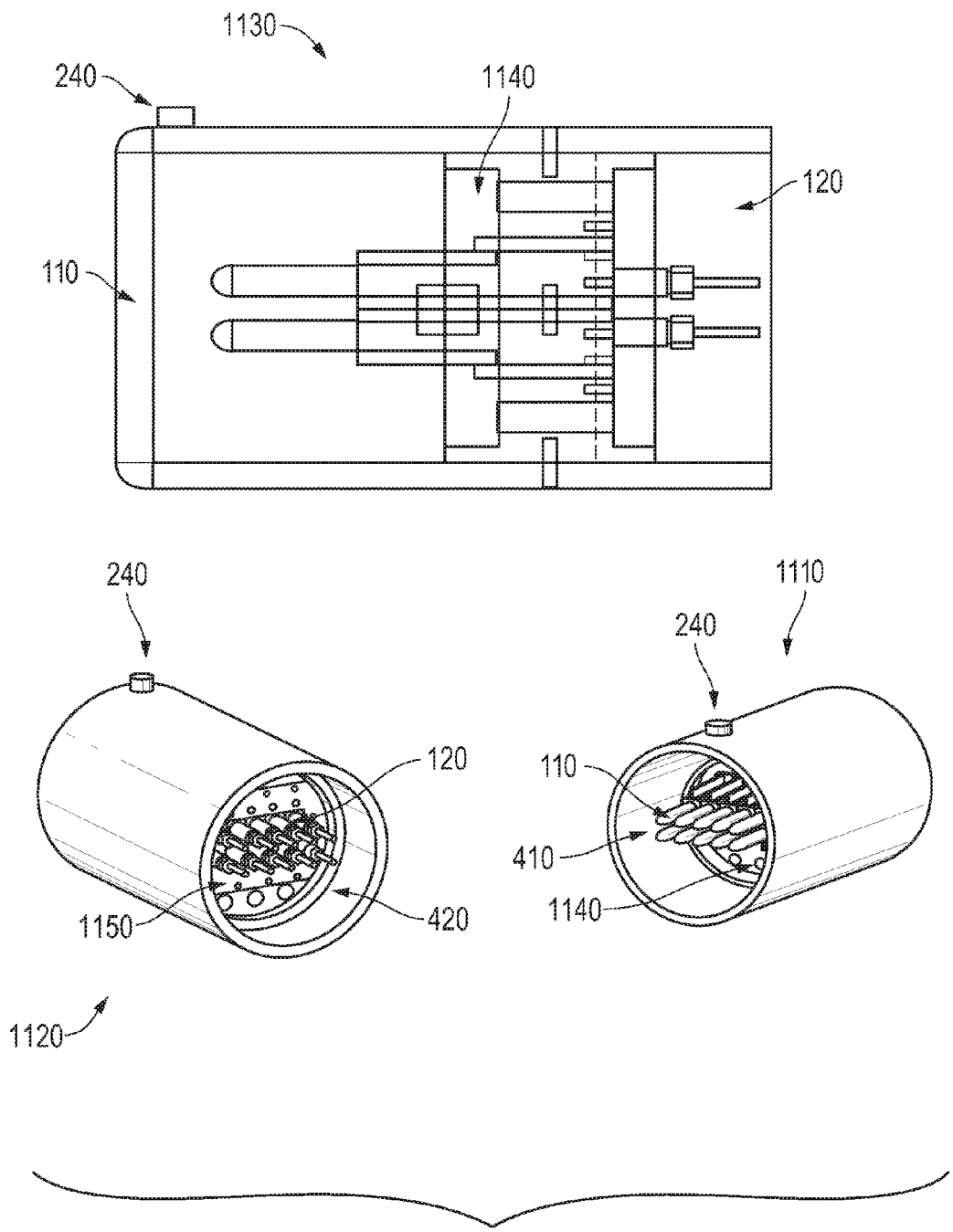
FIG. 11 is a mechanical drawing and schematics of a plug connector with fixed pin subassembly unit pin connectors.

One alternative embodiment incorporating plungers for providing spring backing to the connectors and is shown with reference now to FIG. 11. Shown are a front/side view 1110 of the plug connector 500, a rear/side view 1120 of the plug connector 500, and a mechanical side view drawing 1130 of the plug connector 500. The forward end 410 of the pin subassembly unit 400 includes the plurality of wet engagement mate pin connector 100 pin contact forward ends 110, which are fixed and held in place by the insert 1140. The rear end 420 of the pin subassembly unit 400 includes the plurality of complementary pin connector cables 120, which are fixed and held in place by the retainer plate 1150.

Figure 12:
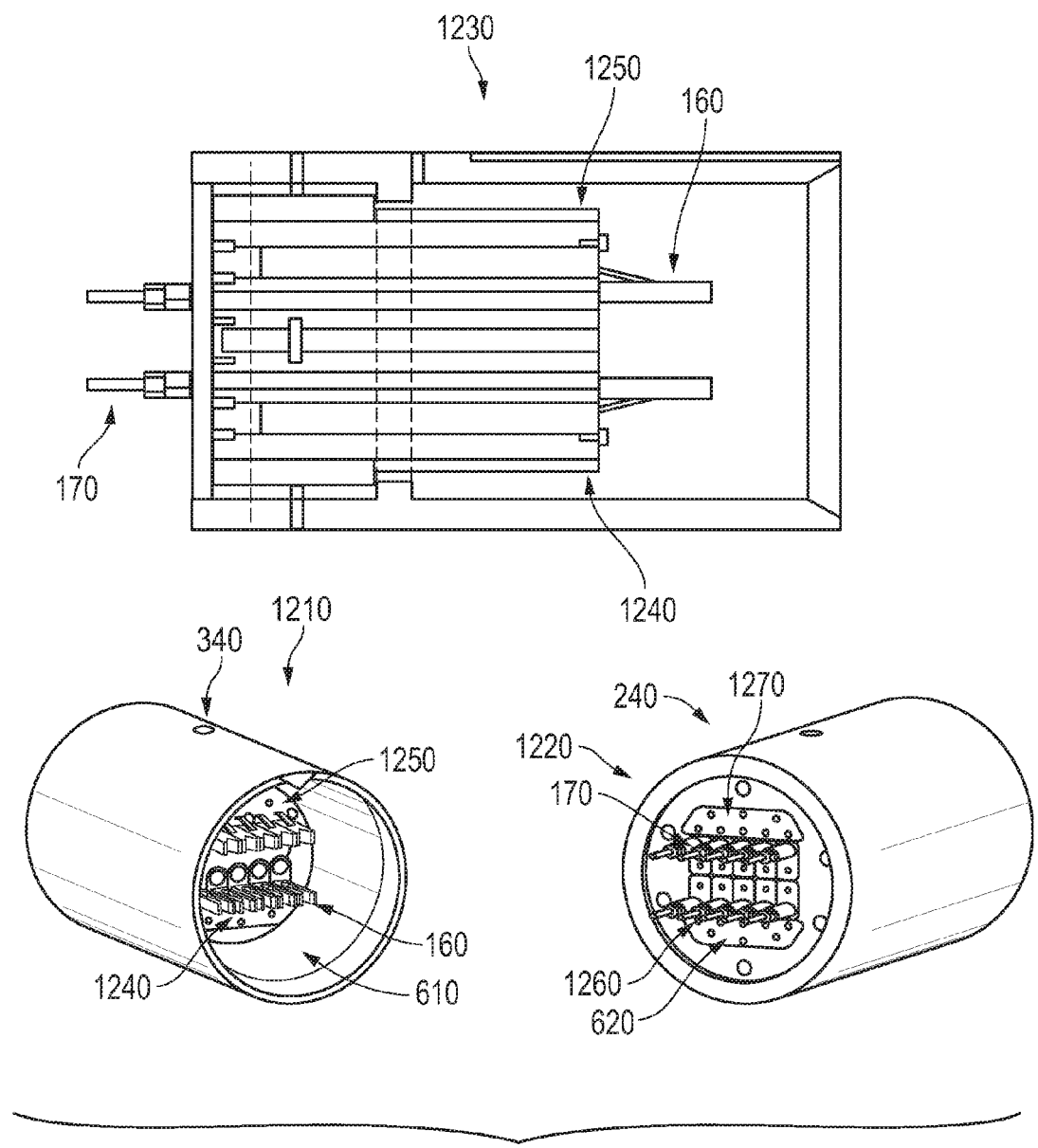
FIG. 12 is a mechanical drawing and schematics of a receptacle connector with floating socket subassembly unit socket connectors.

In one embodiment utilizing the exemplary pin assembly of FIG. 1 and with reference now in particular to FIG. 12, shown are a front/side view 1210 of the receptacle connector 700, a rear/side view 1220 of the receptacle connector 700, and a mechanical side view drawing 1230 of the receptacle connector 700. The forward end 610 of the socket subassembly unit 600 includes the plurality of wet engagement mate socket connector 150 socket contact forward ends 160, which are floating (free to move) and adapted for mating engagement with the fixed pin contact forward ends 110. The socket connector 150 socket contact forward ends 160 are held in place in the socket subassembly unit 600 by a bottom front retainer plate 1240 and a top front retainer plate 1250. The rear end 620 of the socket subassembly unit 600 includes the plurality of complementary socket connector cables 170, which are held in place in the socket subassembly unit 600 by the bottom rear retainer plate 1260 and the top rear retainer plate 1270. By floating the SFF wet engagement mate socket connectors 150 of the socket subassembly unit 600 final alignment of the plug connector 500 to the receptacle connector 700 is achieved. Although the plurality of wet engagement mate pin connectors 100 of the pin subassembly unit 400 are shown as fixed, and the wet engagement mate socket connectors 150 of the socket subassembly unit 600 are shown as floating, one skilled in the art will readily recognize that floating wet engagement mate pin connector 100 and fixed wet engagement mate socket connector 150 alignment configurations can also be implemented without deviating from the spirit of the present invention.

Figure 13:
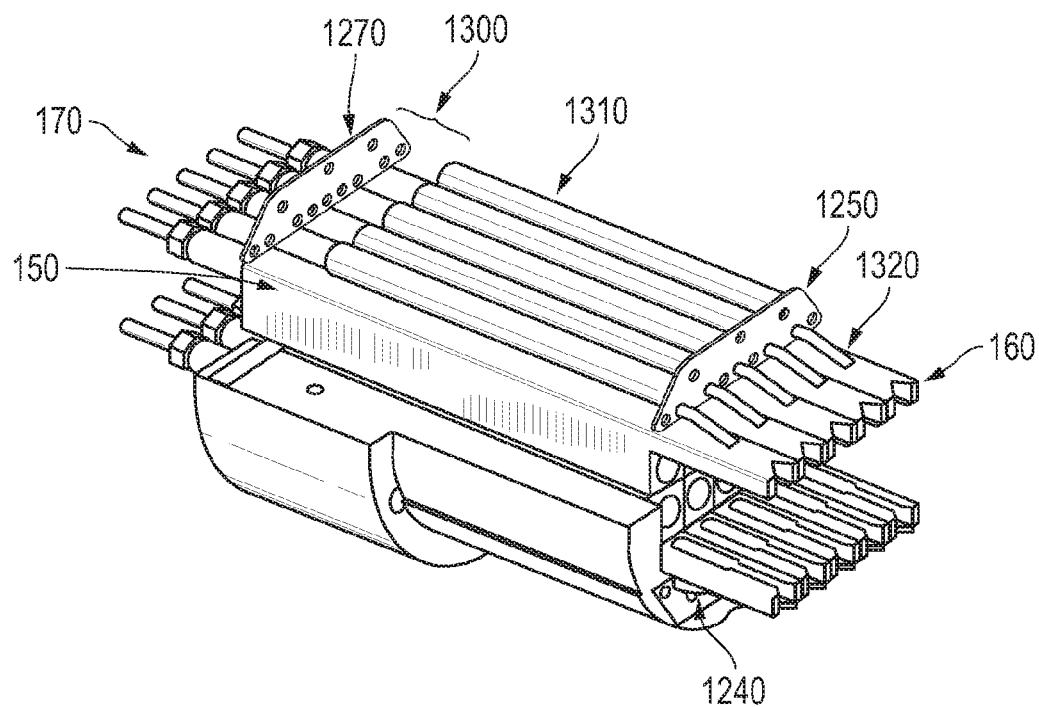
FIG. 13 is a schematic of socket connectors with plungers preloaded by plunger springs for free floating alignment.

With reference now to FIG. 13, shown are ten SFF wet engagement mate socket connectors 150 ganged together in two rows with five socket connectors in each row. To ensure proper mating of each SFF wet engagement mate socket connector 150 to its complementary SFF wet engagement mate pin connector 100, plungers 1310 preloaded by plunger springs 1300 are situated on each SFF wet engagement mate socket connector 150. The plunger springs 1300 are preloaded to allow free floating alignment. The plunger forward end 1320 contacts the wet engagement mate socket connector 150 socket contact forward end 160 to minimize constraints during mating alignment. This ensures proper mating, eliminating binding that could prevent mating. There is clearance between the wet engagement mate socket connectors 150 and the retaining plates 1240, 1250, 1260, and 1270 to allow the wet engagement mate socket connector 150 to float (or "rattle" around) side to side. The plunger spring 1300 pushing on each wet engagement mate socket connector 150 ensures that it completely mates with the corresponding wet engagement mate pin connector 100. Manufacturing tolerances create the need for the floating feature and spring.

Figure 14:
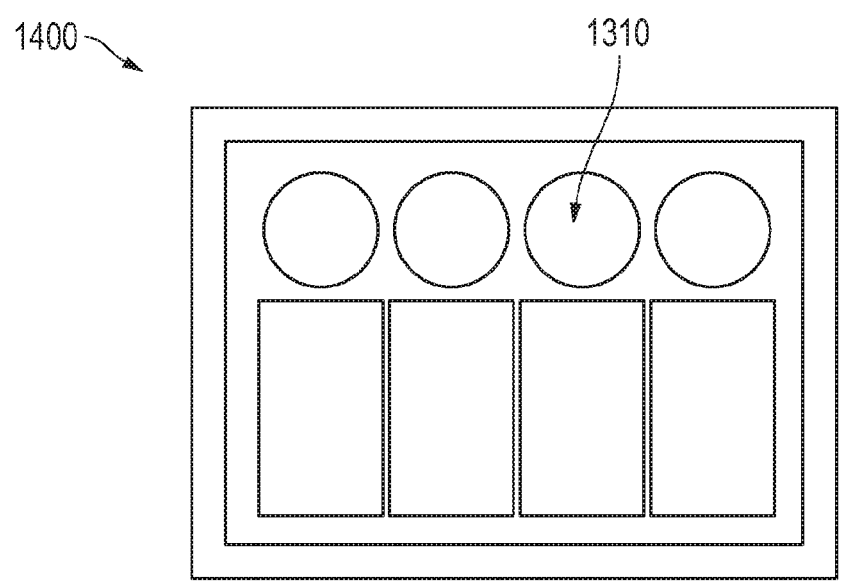
FIG. 14 is a schematic of a rectangular modular and scalable high optical-fiber count connector.

With reference now to FIG. 14, shown is a cross section schematic of a rectangular four SFF engagement mate connector assembly 1400. Exemplary dimensions of the rectangular connector 1400 are 5.5 inches by 4 inches. With respect to a circular connector assembly, the rectangular connector assembly 1400 is more compact but not as conducive to diver or remotely operated autonomous underwater vehicle use. Circular assembly connectors are generally more robust in that the contacts can be protected with a "scoop proof" design as shown in FIG. 9. Circular shell units 200 and 300 shown in FIGS. 2 and 3, respectively, tend to have better crush resistance due to the circular geometry.

The foregoing disclosure and description of the invention are illustrative and explanatory thereof, and various changes in the size, shape and materials, as well as in the details of the illustrated construction may be made without departing from the spirit of the invention.

The invention claimed is:

1. A modular and scalable high optical fiber count connector assembly comprising;

a plug shell unit having a forward end, a rear end, and a hollow body; an alignment pin is situated on a top surface of the plug shell unit;

a pin subassembly unit includes a plurality of small form factor engagement mate pin connectors having a pin contact forward end and a cable rear end; a forward end of the pin subassembly unit includes a plurality of pin connector pin contacts; and, a rear end of the pin subassembly includes a plurality of complementary pin connector cables;

a plug connector formed by inserting the pin subassembly unit into the plug shell unit hollow body; a forward end of the plug connector includes the plurality of pin connector pin contacts; and, a rear end of the plug connector includes the plurality of complementary pin connector cables;

a receptacle shell unit having a forward end, a rear end, and a hollow body; an alignment slot is situated on a top surface of the receptacle shell unit;

a socket subassembly unit includes a plurality of small form factor engagement mate socket connectors having a socket contact forward end and a cable rear end; a forward end of the socket subassembly unit includes a plurality of socket connector socket contacts; and, a rear end of the socket subassembly unit includes a plurality of complementary socket connector cables; and, a receptacle connector adapted for mating engagement with the plug connector and formed by inserting the socket subassembly unit into the receptacle shell unit hollow body; a forward end of the receptacle connector includes the plurality of socket connector socket contacts; and, a rear end of the receptacle connector includes the plurality of complementary socket connector cables; whereby the forward end of the receptacle connector engagement mates to the forward end of the plug connector.

2. The connector assembly of claim 1 wherein the receptacle connector engagement mates to the plug connector includes latching of the plug shell unit to the receptacle shell unit.

3. The connector assembly of claim 1 wherein the receptacle connector wet engagement mates to the plug connector.

4. The connector assembly of claim 1 wherein the receptacle connector scoop-proof engagement mates to the plug connector.

5. The connector assembly of claim 1 wherein the receptacle shell unit and plug shell unit are circular.

6. The connector assembly of claim 1 wherein the receptacle shell unit and plug shell unit are rectangular.

7. The connector assembly of claim 1 further comprising a splice chamber in contact with the rear end of the plug connector wherein the plurality of complementary pin connector cables are combined into a single cable.

8. The connector assembly of claim 1 further comprising a splice chamber in contact with the rear end of the receptacle connector wherein the plurality of complementary socket connector cables are combined into a single cable.

9. The connector assembly of claim 1 wherein the plug connector includes a plurality of fixed pin connector pin contacts.

10. The connector assembly of claim 1 wherein the receptacle connector includes a plurality of floating socket connector socket contacts.

11. The connector assembly of claim 10 wherein the plurality of floating socket connector socket contacts includes a complementary plurality of plungers preloaded with plunger springs.

12. A method for assembling a modular and scalable high optical fiber count connector, the method comprising:

providing a plug shell unit having a forward end, a rear end, and a hollow body; an alignment pin is situated on a top surface of the plug shell unit;

forming a pin subassembly unit by ganging together a plurality of small form factor engagement mate pin connectors having a pin contact forward end and a cable rear end; the pin subassembly unit is formed having a forward end including a plurality of pin connector pin contacts, and a rear end including a plurality of complementary pin connector cables;

inserting the pin subassembly unit into the plug shell unit hollow body to form a plug connector; the plug connector is formed having a forward end including the plurality of pin connector pin contacts, and a rear end including the plurality of complementary pin connector cables;

providing a receptacle shell unit having a forward end, a rear end, and a hollow body; an alignment slot is situated on a top surface of the receptacle shell unit;

forming a socket subassembly unit by ganging together a plurality of small form factor engagement mate socket connectors having a socket contact forward end and a cable rear; the socket subassembly unit is formed having a forward end including a plurality of socket connector socket contacts, and a rear end including a plurality of complementary socket connector cables;

inserting the socket subassembly unit into the receptacle shell unit hollow body to form a receptacle connector adapted for mating engagement with the plug connector; the receptacle connector is formed having a forward end including the plurality of socket connector socket contacts, and a rear end including the plurality of complementary socket connector cables; and engagement mating the forward end of the receptacle connector to the forward end of the plug connector.

13. The method of claim 12 wherein the engagement mating of the receptacle connector to the plug connector includes latching of the plug shell unit to the receptacle shell unit.

14. The method of claim 12 wherein the engagement mating of the receptacle connector to the plug connector forms a wet engagement mating.

15. The method of claim 12 wherein the engagement mating of the receptacle connector to the plug connector forms a scoop-proof engagement mating.

16. The method of claim 12 further comprising forming a splice chamber in contact with the rear end of the plug connector wherein the plurality of complementary pin connector cables are combined into a single cable.

17. The method of claim 12 further comprising forming a splice chamber in contact with the rear end of the receptacle connector wherein the plurality of complementary socket connector cables are combined into a single cable.

18. The method of claim 12 wherein the plug connector is formed having a plurality of fixed pin connector pin contacts.

19. The method of claim 12 wherein the receptacle connector is formed having a plurality of floating socket connector socket contacts.

20. The method of claim 19 wherein the plurality of floating socket connector socket contacts includes forming a complementary plurality of plungers preloaded with plunger springs.

* * * * *